Jan. 22, 1929.
A. W. FERGUSON
1,699,882
SKID
Filed Oct. 16, 1926
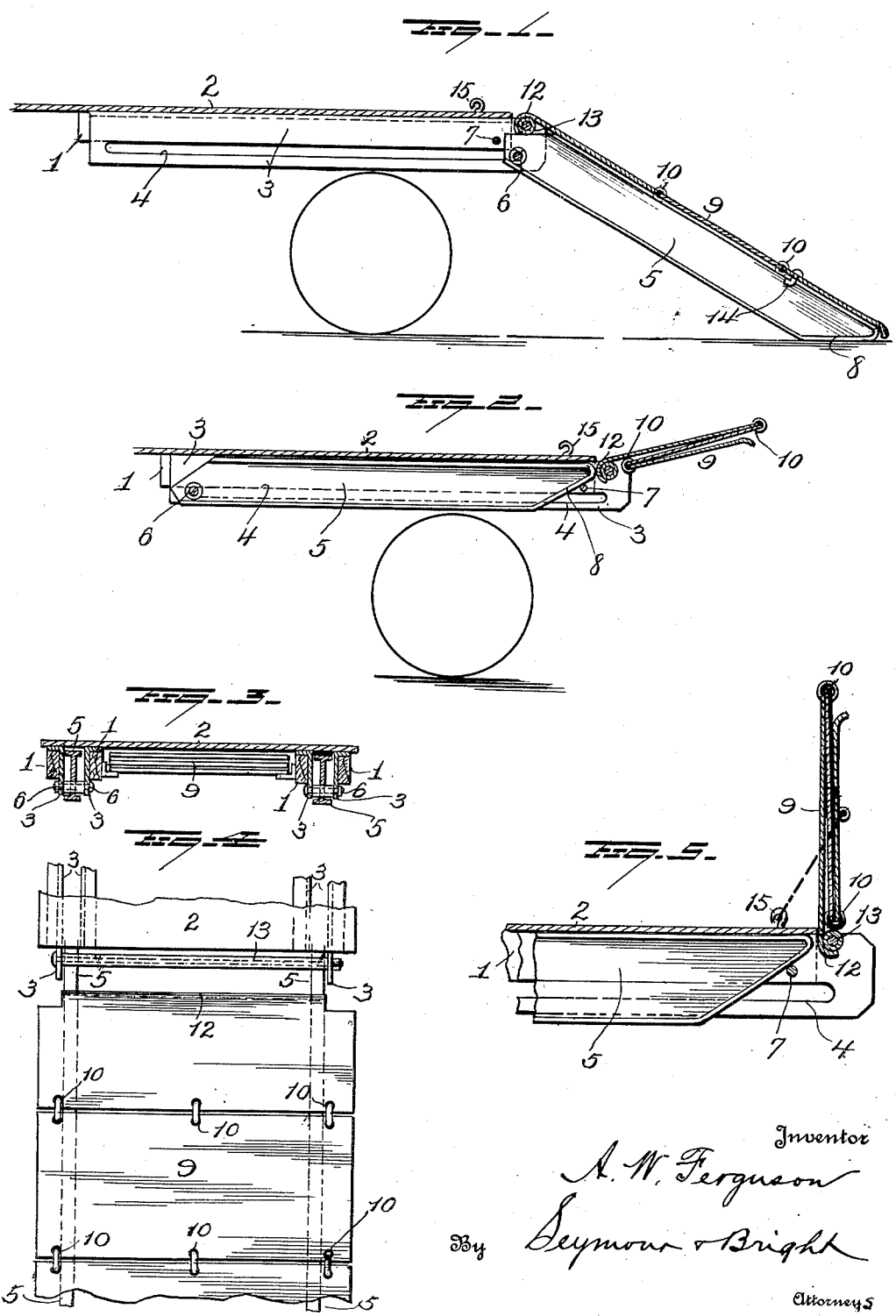
Inventor
A. W. Ferguson
By Seymour & Bright
Attorneys Patented Jan. 22, 1929.

1,699,882

UNITED STATES PATENT OFFICE.

ALONZO W. FERGUSON, OF DENOYA, OKLAHOMA.

SKID.

Application filed October 16, 1926. Serial No. 142,015.

My invention relates to means for loading vehicles and retaining a load on a vehicle and has for its object the provision of a device of simple and inexpensive construction which may be easily arranged for use as a skid, set up as an end gate, or collapsed into compact form to be carried under the floor of the wagon bed. The invention is illustrated in the accompanying drawing and will be hereinafter fully described, the novel features being particularly defined in the appended claims.

In the drawings, Figure 1 is a longitudinal section of the rear end of a truck with my invention connected thereto and arranged as a skid;

Figure 2 is a view partly in section and partly in side elevation showing the skid collapsed.

Figure 3 is a transverse section showing the skid floor disposed beneath the truck bed;

Fig. 4 is a plan view of the skid;

Fig. 5 is a view similar to Fig. 2, showing the device arranged as an end gate.

The truck may be of any known form and is illustrated as a chassis having longitudinal sills or beams 1 and a floor or bed 2 secured upon the beams or sills. As shown most clearly in Fig. 3, the sills are arranged in pairs, and to the inner or opposed sides of the members of each pair, at the rear ends thereof, I secure the hanger plates 3 which depend below the sills and are constructed with longitudinal slots 4 in a horizontal plane immediately below the sills. The skid bars 5 are adapted to fit between and be carried by the hanger plates and may conveniently be I-bars provided at their front ends with transverse pins or studs 6 playing in the slots 4 whereby to be supported and guided for sliding movement. At or near their rear ends, the hanger plates carry a transverse rest 7 passing under and supporting the rear end portions of the skid bars against dropping when the latter are in inactive position but permitting them to be readily drawn out into active position. When in active position, the rear ends of the skid bars rest on the ground and, to prevent them sinking into and digging up the ground, they are equipped with shoes 8. If the skid bars be drawn rearward until the pins or studs 6 reach the rear ends of the slots 4, they may be set in an inclined position in rear of the truck to support the skid plates or floor sections 9 in proper position to guide objects up onto the floor of the truck. The floor sections 9 may be provided in any number but ordinarily three sections will be sufficient. The sections are flexibly connected, as by rings 10 engaged through corresponding eyes or openings in the meeting edges of adjacent sections. That section which, in use, becomes the uppermost section, is provided along its free upper edge with a hook 12 to engage over a rod 13 on the rear end of the truck whereby to be held in operative relation to the truck. The lowermost section is provided with hooks 14 adapted to engage in the skid bars and hold the skid floor from sliding up the skid bars and hold the skid bars in proper position to support the load. On the truck, at its rear corners, are hooks 15 to which the skid floor may be tied, as shown in Fig. 5, the several sections being folded together and set on edge to serve as an end gate. When not in use, either as an end gate or a skid, the flexibly-connected sections may be folded together and supported between the sills 1 of the chassis.

My device is obviously simple and inexpensive and may be readily applied to any truck. Its use will expedite the loading of large heavy cumbersome objects onto a truck or other vehicle and it may be used in connection with a winch and loading cables of any description.

Having fully described my invention what I claim as new and desire to secure by Letters Patent, is:—

1. Means for the purposes set forth comprising skid bars, means for slidably connecting the front ends of the skid bars to a vehicle, a skid floor to rest on the skid bars when they are extended, and means for connecting the skid floor to the vehicle.

2. Means for the purpose set forth comprising skid bars, means for slidably connecting the front ends of the bars beneath a vehicle bed whereby they may be disposed beneath the bed or in inclined position at the rear of the vehicle, a skid floor resting on the skid bars, means for engaging the upper end of the skid floor with the vehicle bed, and means for engaging the lower portion of the skid floor with the skid bars.

In testimony whereof, I have signed this specification.

ALONZO W. FERGUSON.